F. J. LYSTER.
APPARATUS FOR THE CONCENTRATION OF ORES.
APPLICATION FILED NOV. 18, 1916.
1,352,072. Patented Sept. 7, 1920.
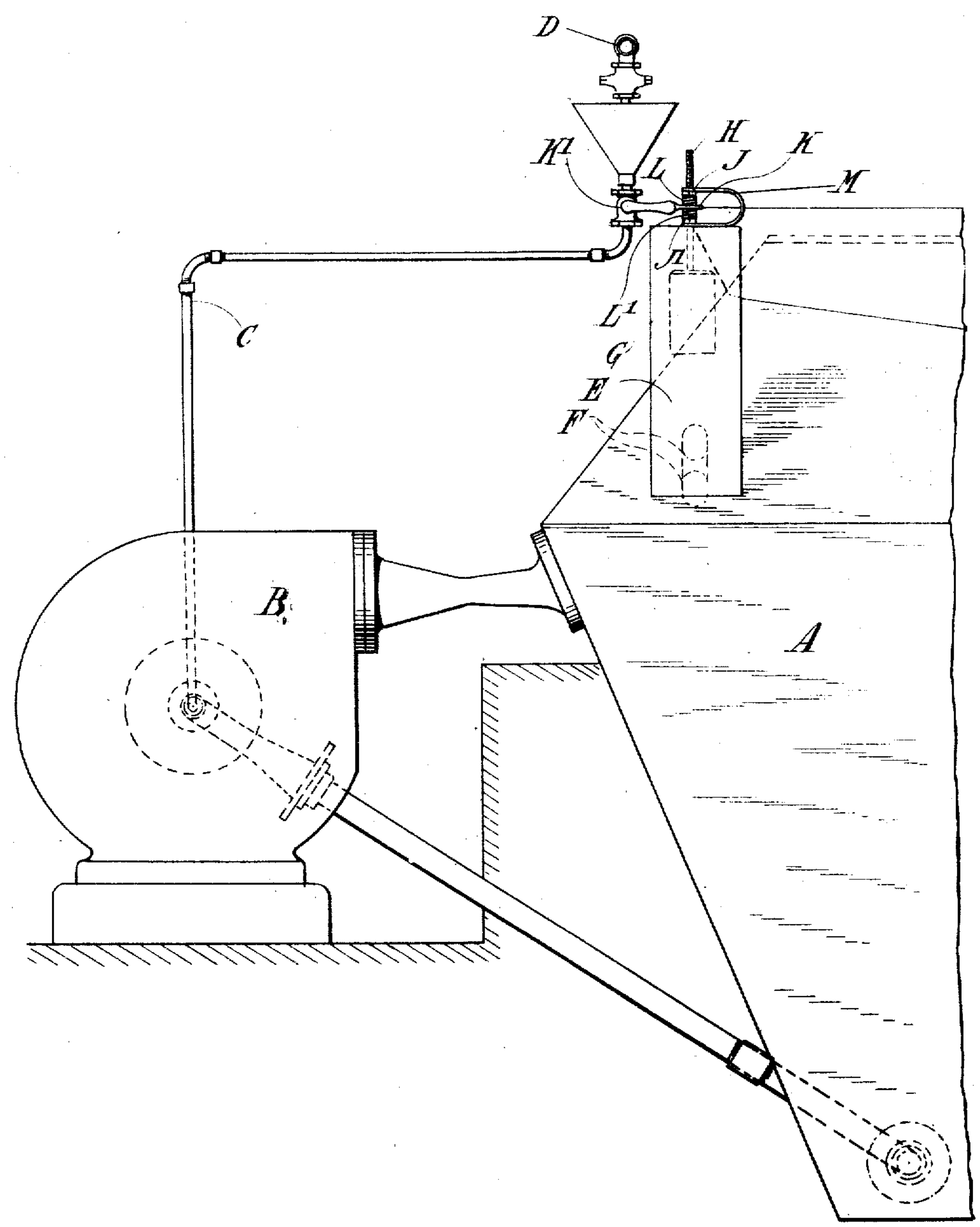
Inventor:
Pleury James Lyster
By Henry D. Williams
Attorney.

UNITED STATES PATENT OFFICE.

FLEURY JAMES LYSTER, OF BROKEN HILL, NEW SOUTH WALES, AUSTRALIA, ASSIGNOR, BY MESNE ASSIGNMENTS, TO MINERALS SEPARATION NORTH AMERICAN CORPORATION.

APPARATUS FOR THE CONCENTRATION OF ORES.

1,352,072. Specification of Letters Patent. Patented Sept. 7, 1920.

Application filed November 18, 1916. Serial No. 132,059.

*To all whom it may concern:*

Be it known that I, FLEURY JAMES LYSTER, a subject of the King of England, residing at Broken Hill, New South Wales, Australia, have invented certain new and useful Improvements in Apparatus for the Concentration of Ores, of which the following is a specification.

This invention relates to apparatus for the concentration of ores, and particularly to apparatus for carrying out the froth flotation process in which the ore is finely ground and mixed with water to which is added a small proportion of a mineral-frothing agent, the mixture thereupon being subjected to aeration and agitation for the formation of a froth of the metalliferous particles of the ore, as is described for example in the prior patents No. 835,120, November 6, 1906, to Sulman *et al.;* No. 962,678, June 28, 1910, to Sulman *et al.;* and No. 1,064,723, June 17, 1913, to Greenway *et al.*

The present invention relates particularly to apparatus for carrying out such a process, of the type in which air is admitted beneath the surface of the liquid in the separating box, as is described for example in the prior patents: No. 953,746, April 5, 1910, to Hoover and No. 1,155,815, October 5, 1915, to Higgins *et al.* It is specially applicable to apparatus in which a centrifugal pump is employed for aerating the pulp, as is described for example in the prior patent No. 1,203,372, October 31, 1916, to Lyster. In such an apparatus a number of flotation vessels and centrifugal pumps are arranged in series so that each centrifugal pump withdraws the material from the bottom of one vessel, agitates it and delivers it into the next flotation vessel. The centrifugal pumps act as agitators or mixers, and means are provided, such as an inlet pipe, for feeding in the requisite amount of mineral-frothing agent, as well as the requisite amount of air into a suction pipe communicating with each pump. It has been usual to control the delivery of the pump by adjusting the admission of air to it.

In practice the plant is set to accommodate a certain uniform flow of material, but difficulty is often experienced with slight variations in the flow between two vessels or boxes, thereby necessitating constant adjustment and regulation to maintain a constant level in the said vessels or boxes.

It is an object of the present invention to control automatically the delivery of the pump by controlling automatically the quantity of air admitted to it, according to the level of the liquid in the flotation vessel. Thus any slight variation in the flow between any two vessels may be adjusted in the running of the plant itself, and the liquid in the various vessels maintained at a constant level.

It has previously been proposed to control the level of the liquid in a flotation vessel by a float in the said vessel arranged to operate a valve controlling the outflow of liquid therefrom.

The illustrated adaptation of the present invention comprises a float arranged in the said separating vessel, a cock on the air intake pipe of the apparatus and an operative connection between said float and cock, so that the air supplied is reduced as the level of liquid in the separating vessel falls.

One adaptation of the invention is illustrated in the accompanying drawing, which shows an elevation of a single concentrating unit for employment in a series plant such as described in the aforesaid prior patent No. 1,203,372. In this practice of the invention, a number of separating boxes, such as A, and centrifugal pumps, such as B, are arranged in series, each centrifugal pump drawing material from the bottom of one box, agitating it and delivering it to the next succeeding box. Each pump has an air intake pipe C, to which also mineral-frothing agent is supplied through an oil pipe D. Each flotation vessel is provided with a superimposed chamber E connected with it by the orifice F. Within the said chamber is accommodated a float G of wood. This float carries at its upper end a threaded rod H, on which are two nuts J J[1]. Arranged between the nuts is a lever K operatively connected to the air cock K[1] on the air intake pipe C of the pump B. Springs L L[1] are arranged to bear on the said nuts J J[1] and on the end of the lever K arranged between them. A clip M is also preferably arranged to bear on the sides of the nuts J J[1] remote from the springs.

The operation of the apparatus is as follows:—As the level of the liquid in the separating box A fluctuates, the float G rises and falls within the superimposed chamber E, and thereby opens or closes the air cock K[1] according to the level of the material in the separating box A, that is, as the level of the material falls the admission of air is reduced, thereby allowing the pump to pass a larger quantity of liquid and make up the deficiency in the flotation box.

Various other adaptations of the invention may be devised within the spirit, principles and scope of the following claims.

What I claim as my invention and desire to secure by Letters Patent is:—

1. A froth-flotation ore-concentrating apparatus comprising a separating vessel, a pulp-agitating-and-aerating pump adapted to draw in air and introduce it into the pulp and deliver the aerated pulp to the separating vessel, a float in the separating vessel, and means controlling the admission of air to the pump and controlled by the float to increase the feed of air to the pump as the liquid level rises in the separating vessel.

2. In a froth-flotation ore-concentrating apparatus, a froth separating vessel, a pulp-agitating-and-aerating pump adapted to draw in air and introduce it into the pulp and deliver the aerated pulp to the froth-separating vessel, and means automatically responsive to the level of the pulp in said vessel for adjusting the admission of air to said pump and thereby controlling the amount of pulp delivered by said pump.

3. In a froth-flotation ore-concentrating apparatus, a froth-separating vessel, a centrifugal pump delivering agitated and aerated pulp to the froth-separating vessel, and means automatically responsive to the level of the pulp in said vessel for adjusting the admission of air to said pump and thereby controlling the amount of pulp delivered by said pump.

In testimony whereof I have signed my name to this specification in the presence of two subscribing witnesses.

FLEURY JAMES LYSTER.

Witnesses:

ARTHUR GORE COLLISON,
FLORENCE MANTHORPE.